US008959896B2

(12) United States Patent
Yanagida

(10) Patent No.: US 8,959,896 B2
(45) Date of Patent: Feb. 24, 2015

(54) REED VALVE

(75) Inventor: Etsugou Yanagida, Chiryu (JP)

(73) Assignee: Denso Corporation, Kariya (JP)

( * ) Notice: Subject to any disclaimer, the term of this patent is extended or adjusted under 35 U.S.C. 154(b) by 840 days.

(21) Appl. No.: 13/182,731

(22) Filed: Jul. 14, 2011

(65) Prior Publication Data

US 2012/0012774 A1 Jan. 19, 2012

(30) Foreign Application Priority Data

Jul. 16, 2010 (JP) ................................ 2010-161666

(51) Int. Cl.
*F01N 3/00* (2006.01)
*F16K 15/16* (2006.01)

(52) U.S. Cl.
CPC ..................................... *F16K 15/16* (2013.01)
USPC ................... 60/293; 60/304; 60/305; 60/306; 137/512.15; 137/855

(58) Field of Classification Search
CPC ......... F01N 3/34; F01N 3/30; F01N 2590/04; F02B 61/02; F02B 2075/027; F16K 15/144; F16K 15/147; F16K 15/148; F16K 15/16; F04B 39/1073
USPC ........................... 60/293, 304, 305, 306, 307; 137/512.15, 855
See application file for complete search history.

(56) References Cited

U.S. PATENT DOCUMENTS 2,223,944 A * 12/1940 Roy ................................ 137/517
3,191,618 A * 6/1965 McKim .......................... 137/855
3,391,628 A * 7/1968 Ziegenfelder .................. 454/164
4,083,184 A * 4/1978 Ushijima et al. ................. 60/293
4,387,565 A * 6/1983 Otani et al. ....................... 60/293
RE37,974 E * 2/2003 Bowers ........................... 137/855
6,648,004 B2 * 11/2003 Lau ................................. 137/223
6,837,265 B2 * 1/2005 Porter et al. .............. 137/512.15
7,028,689 B2 4/2006 Martin et al.
7,201,189 B2 * 4/2007 Inui et al. ....................... 137/855
7,493,900 B1 * 2/2009 Japuntich et al. ......... 128/206.15
7,503,326 B2 * 3/2009 Martin ..................... 128/205.24
2004/0255947 A1 * 12/2004 Martin et al. ............ 128/206.15
2005/0061327 A1 * 3/2005 Martin et al. ............ 128/206.15

FOREIGN PATENT DOCUMENTS

JP       5-89876        12/1993
JP       P2003-184562 A  7/2003
JP       2006017236 A *  1/2006

OTHER PUBLICATIONS

Japanese Office Action dated Jul. 24, 2012, issued in corresponding Japanese Application No. 2010-161666 with English translation.

* cited by examiner

*Primary Examiner* — Thomas Denion
*Assistant Examiner* — Patrick Maines
(74) *Attorney, Agent, or Firm* — Nixon & Vanderhye P.C.

(57) ABSTRACT

A reed valve is adapted to be fixed to a fixing member. The reed valve includes a valve plate and a resiliently deformable reed. The valve plate is fixed to the fixing member and includes a frame part and a supporting column. The frame part has an opening inward of the frame part. The opening passes through the frame part in a thickness direction of the valve plate. The supporting column is disposed across an inside of the opening. The reed is configured to open or close the opening. The frame part includes a frame seating surface with which the reed is engaged. The supporting column includes a column seating surface with which the reed is engaged. The column seating surface is recessed relative to the frame seating surface in the thickness direction.

3 Claims, 5 Drawing Sheets

REED VALVE

CROSS REFERENCE TO RELATED APPLICATION

This application is based on and incorporates herein by reference Japanese Patent Application No. 2010-161666 filed on Jul. 16, 2010.

BACKGROUND OF THE INVENTION

1. Field of the Invention

The present invention relates to a reed valve that limits a flow direction of fluid to only one direction using a resiliently deformable reed having a thin plate shape.

2. Description of Related Art

A conventional technology of a reed valve will be described in reference to FIGS. 5A and 5B. A reed valve 11 includes a valve plate 13 that has an opening 12 passing through the plate 13 in its thickness direction, and a resiliently deformable reed 14 that opens and closes the opening 12. (i) When a pressure in a valve closing direction (downward pressure in FIG. 5B) from one side of the valve plate 13 (upper side in FIG. 5B) toward the valve plate 13 is applied to the valve 11, the reed 14 is closely-attached on the valve plate 13 around the opening 12 to close the opening 12 (valve-closed); and (ii) Conversely, when a pressure in a valve opening direction (upward pressure in FIG. 5B) from the other side of the valve plate 13 (lower side in FIG. 5B) toward the valve plate 13 is applied to the valve 11, the reed 14 is resiliently deformed to open the opening 12 (valve-open).

At the time of valve closing, the reed 14 closes the opening 12 upon application of the pressure in the valve closing direction to the reed 14. Accordingly, if the pressure in the valve closing direction is large, a load applied to the reed 14 becomes large, so that the reed 14 may be greatly deformed. In such a case, (i) the reed 14 sinks toward the inside of the opening 12, and a sealed state of the opening 12 cannot thereby be maintained; (ii) the reed 14 does not return to its normal position as a result of sinking of the reed 14 inward of the opening 12; or (iii) defects (e.g., plastic deformation) may be caused in the reed 14 due to increase of the deformation of the reed 14. Therefore, as illustrated in FIGS. 5A and 5B, the reed valve 11 that prevents the defects such as the above-described (i) to (iii) by providing a supporting column 16 passing across the opening 12 inward of a frame part 15 is proposed.

Problems of the conventional technology will be described. The load in the valve closing direction that the reed 14 receives is applied greatly to a part of the valve 11 whose contact area with the reed 14 is large. Accordingly, in the case of the conventional technology, where a frame seating surface 15a of the frame part 15 with which the reed 14 is engaged, and a column seating surface 16a of the supporting column 16 with which the reed 14 is engaged, are formed in the same plane, a greater load is applied to to the supporting column 16 having a larger contact area with the reed 14, as indicated by a difference between sizes of white arrows in FIG. 5B (A).

On the other hand, since the frame part 15 of the valve plate 13 is fixed and supported by a fixing member, strength of the frame part 15 is increased by the fixing member. Accordingly, despite the application of the load in the valve closing direction to the frame part 15 by the reed 14, stress concentration on the frame part 15 is mitigated. However, strength of the supporting column 16 is not increased as with the frame part 15 because the supporting column 16 is provided inward of the frame part 15. Thus, upon application of the load in the valve closing direction by the reed 14, the stress concentration is generated particularly on the supporting column 16 on a central side of the opening 12 (B).

As described in the above (A) (B), when the load in the valve closing direction is applied by the reed 14, a greater load acts on the supporting column 16, and the stress concentration is caused on the central side of the supporting column 16. As a result, the supporting column 16 is subject to fracture. In JP-UM-A-H05-089876, a technology whereby part of a seating surface of a valve plate is caved in so as to reduce a contact area between a reed and the valve plate is disclosed for the technology relating to the reed valve. However, the technology described in JP-UM-A-H05-089876 decreases adhesive force of a contact surface between the reed and the valve plate by the reduction of the contact area between the reed and the valve plate, so as to facilitate the valve-opening by the reed. Therefore, this technology has a completely different objective from the present invention.

SUMMARY OF THE INVENTION

The present invention addresses at least one of the above disadvantages.

According to the present invention, there is provided a reed valve adapted to be fixed to a fixing member. The reed valve includes a valve plate and a resiliently deformable reed. The valve plate is fixed to the fixing member and includes a frame part and a supporting column. The frame part has an opening inward of the frame part. The opening passes through the frame part in a thickness direction of the valve plate. The supporting column is disposed across an inside of the opening. The reed is configured to open or close the opening. The frame part includes a frame seating surface with which the reed is engaged. The supporting column includes a column seating surface with which the reed is engaged. The column seating surface is recessed relative to the frame seating surface in the thickness direction.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1A:
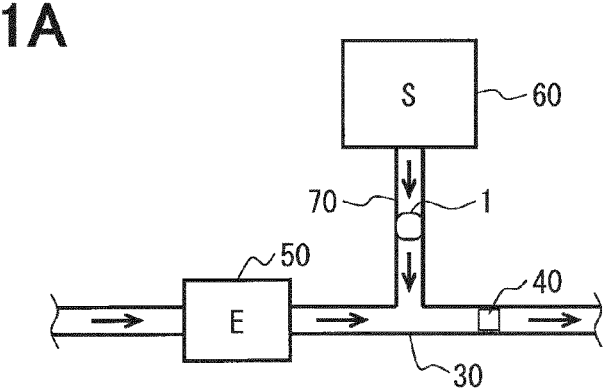
FIG. 1A is a schematic illustration of a secondary air supply system including a secondary air passage with a reed valve though which aid is pressure-fed into an exhaust passage of an engine.
Figure 1B:
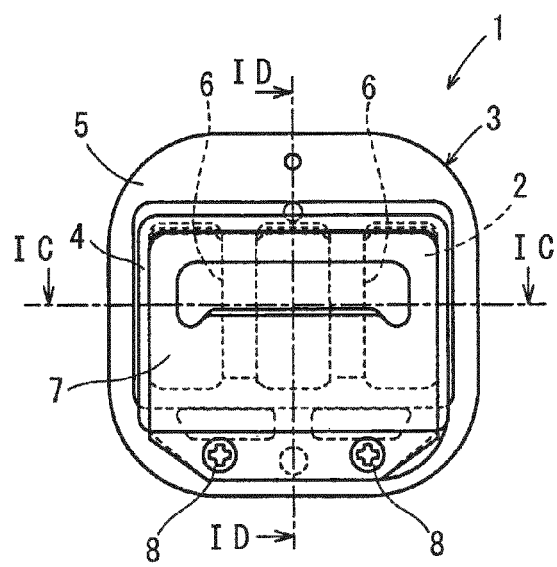
FIG. 1B is a plan view illustrating a reed valve in accordance with a first embodiment of the invention.
Figure 1C:
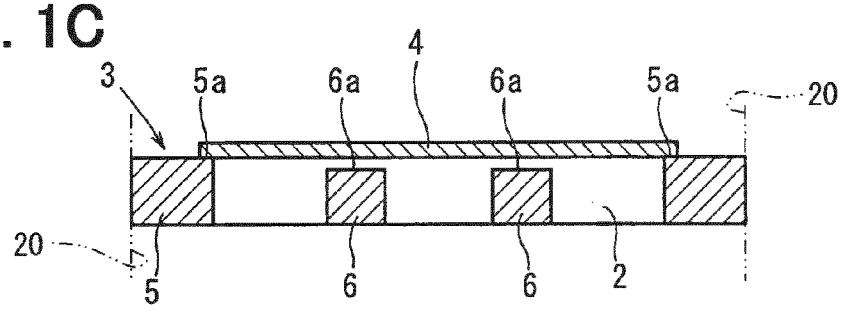
FIG. 1C is a sectional view roughly illustrating a valve plate and a reed taken along a line IC-IC in FIG. 1B.
Figure 1D:
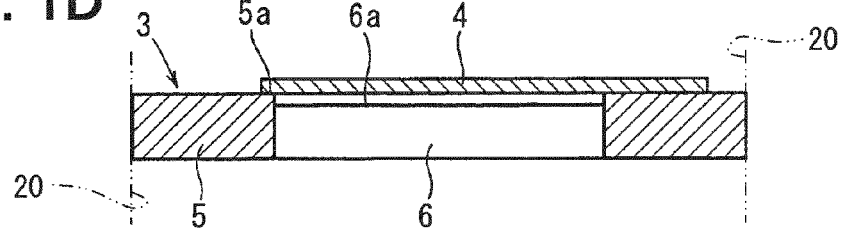
FIG. 1D is a sectional view roughly illustrating the valve plate and the reed taken along a line ID-ID in FIG. 1B.

A reed valve 1 is adapted to be fixed to fixing member 20. The reed valve 1 includes a valve plate 3 and a resiliently deformable reed 4. A surrounding area of the valve plate 3 is fixed to the fixing member 20. The valve plate 3 includes a frame part 5 and a supporting column 6. The frame part 5 has an opening 2 inward of the frame part 5. The opening 2 passes through the frame part 5 in a thickness direction of the valve plate 3. The supporting column 6 is disposed across an inside of the opening 2. The reed 4 is configured to open or close the opening 2. The frame part 5 includes a frame seating surface 5a reed 4 is engaged. The supporting column 6 includes a column seating surface 6a with which the reed 4 is engaged. The column seating surface 6a is recessed relative to the frame seating surface 5a in the thickness direction. Hence, in the case, in which the reed 4 is arranged on the "upper surface" of the valve plate 3, as one example, the column seating surface 6a (upper surface) of the supporting column 6 is "lowered" relative to the frame seating surface 5a (upper surface) of the frame part 5.

Specific examples (embodiments), to which the invention is applied, will be described below in reference to the accompanying drawings. The embodiment discloses a concrete example, and needless to say, the invention is not limited to the following embodiments.

(First Embodiment)

A reed valve 1 illustrated in the present embodiment is used for a secondary air supply system 60. The secondary air supply system 60 supplies air (secondary air) to an upstream side of a catalyst 40 in an exhaust gas flow direction. The catalyst 40 is disposed along an exhaust pipe in an engine 50 for a vehicle (internal combustion engine that generates rotative power by combustion of fuel).

Specifically, the reed valve 1 is disposed along a secondary air passage 70, through which air (secondary air) is pressure-fed into an exhaust passage 30, in the secondary air supply system 60, to be used as a check valve for preventing a backflow of exhaust gas to an upstream side of the secondary air passage 70 in the air flow direction. More specifically, the reed valve 1 is used together with an electromagnetic valve that opens and closes the secondary air passage 70, and the electromagnetic valve and the reed valve 1 constitute a combination valve. The reed valve 1 is disposed on the exhaust-side of the electromagnetic valve so as to prevent a backflow of exhaust gas toward the electromagnetic valve.

Figure 2:
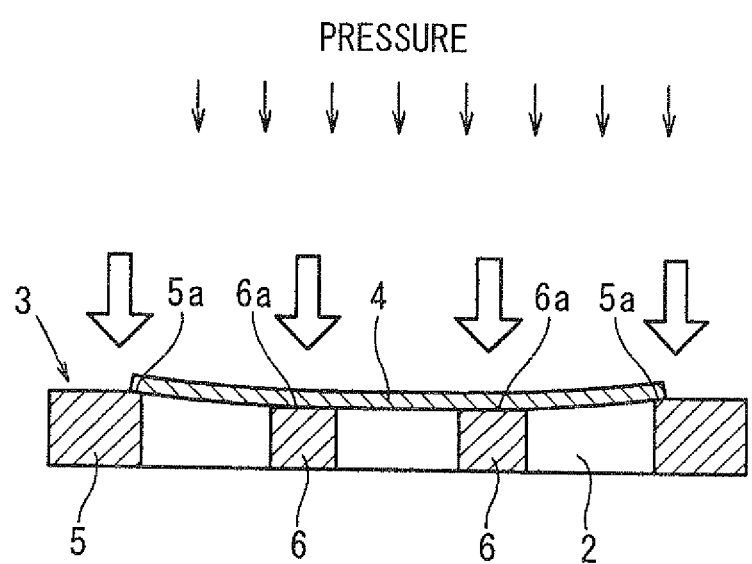
FIG. 2 is a diagram illustrating operation of the reed valve in accordance with the first embodiment.

A concrete example of the reed valve 1 is explained with reference to FIGS. 1A to 2. In the following description, the explanation will be given with an upper side in FIG. 2 referred to as "up" and with a lower side in FIG. 2 referred to as "down". This up-down is for explaining the embodiments, and the reed valve 1 is not limited to this up-down direction. The reed valve 1 includes a valve plate 3 with an opening 2 passing through the plate 3 in its thickness direction; a resiliently deformable reed 4 that opens or closes the opening 2; and a stopper plate 7 that restricts the maximum opening degree of this reed 4. The reed valve 1 is used with a surrounding area of the valve plate 3 fixed to a fixing member 20. The above-described configurations will be specifically described below.

The valve plate 3 is made of a metallic material such as aluminum, and a surface (at least upper surface) of the plate 3 is coated with rubber for improving sealing properties with respect to the valve plate 3 and the fixing member 20. This valve plate 3 includes a frame part 5 that includes the opening 2 having a rectangular shape inward of the frame part 5, and one or more than one (two in the present embodiment) supporting column 6 arranged across the inside of the opening 2 to generally evenly divide an opening area of the opening 2. The valve plate 3 is formed by a forming technique such as die casting, and the frame part 5 and the supporting column 6 are integrally formed.

An upper surface of the frame part 5 (specifically, the portion of the frame part 5 with which the reed 4 is engaged: a frame seating surface 5a) is formed in a planar shape. When the reed 4 is engaged with the frame seating surface 5a, the upper surface of the frame part 5 is closely-attached on the reed 4 having a flat plate shape to airtightly close the opening 2. An upper surface of the supporting column 6 (column seating surface 6a) is also formed into a planar shape.

The valve plate 3 of the present embodiment is formed with the column seating surface 6a of the supporting column 6 one level lower than the frame seating surface 5a of the frame part 5. A lowering amount, by which the column seating surface 6a of the supporting column 6 is lowered relative to the frame seating surface 5a, is set in the following manner. (i) If the column seating surface 6a is not further lowered than the frame seating surface 5a (conventional art), a load in a valve closing direction that is applied by the reed 4 to the supporting column 6 is large, so that the supporting column 6 is easily fractured. (ii) If the amount, by which the column seating surface 6a is lowered relative to the frame seating surface 5a, is small, a part (small amount) of the load in the valve closing direction, which is applied to the supporting column 16 in the conventional art, is applied to the frame part 5. Accordingly, the fracture of the supporting column 6 is limited compared to the conventional art. Nevertheless, the load distributed to the frame part 5 is small. (iii) If the amount, by which the column seating surface 6a is lowered relative to the frame seating surface 5a, is large, a part (large amount) of the load in the valve closing direction, which is applied to the supporting column 16 in the conventional art, is applied to the frame part 5. Accordingly, the load distributed to the frame part 5 is large. Nevertheless, the amount of deformation of the reed 4 becomes large.

As a result, the amount, by which the column seating surface 6a of the supporting column 6 is lowered relative to the frame seating surface 5a, is set in view of both an effect of limiting the fracture of the supporting column 6 and an effect of preventing excessive deformation of the reed 4. Specifically, the amount is set in view of a relationship between "Young's modulus of the reed 4", and "a distribution ratio at which the load in the valve closing direction that is applied to the reed 4 is distributed between the frame part 5 and the supporting column 6".

Next, a technique, whereby the valve plate 3 is fixed to the fixing member 20, i.e., a structure, whereby the reed valve 1 is attached to the secondary air supply system 60 will be described. An outer circumferential edge of the frame part 5 is firmly clamped between a valve housing of the electromagnetic valve, and a secondary air supply pipe that is fastened to this valve housing (pipe member that constitutes the secondary air passage 70 on the exhaust-side of the electromagnetic valve) along its whole circumference. Accordingly, the reed valve 1 is fixed on the exhaust-side of the electromagnetic valve. In this manner, the frame part 5 is fixed and held between the valve housing and the secondary air supply pipe, so that strength of the frame part 5 is increased. As a result, a stress concentration on the frame part 5 is mitigated despite the application of the load in the valve closing direction to the frame part 5 by the reed 4. Even though a comparatively great load is applied to the frame part 5, the fracture of the frame part 5 is avoided.

The reed 4 is a resiliently deformable thin plate that closes the opening 2 as a result of contact of the reed 4 with the frame part 5 around the opening 2 along its whole circumference. The reed 4 is formed from a metallic material such as stainless steel. One side of this reed 4 (lower side in FIG. 1B) is fixed to the valve plate 3 (specifically, to the frame part 5) together with the stopper plate 7 using a coupling member 8 such as a screw or rivet.

Specifically, the reed 4 has a flat surface shape in an unloaded condition. In the unloaded condition, the reed 4 functions such that the reed 4 closes the opening 2 by its force of restitution. Upon application of a pressure in a valve opening direction (supply pressure of secondary air supplied by an air pump: upward pressure) to the reed 4, the reed 4 is upwardly resiliently deformed due to the pressure in the valve opening direction, so that the opening 2 is opened. Conversely, upon application of a pressure in the valve closing direction (exhaust gas pressure: downward pressure) to the reed 4, the reed 4 is closely-attached on a surrounding area of the opening 2 due to the pressure in the valve closing direction, so that the opening 2 is closed.

The stopper plate 7 is for preventing plastic deformation of the reed 4 by limiting the maximum opening degree of the reed 4. The plate 7 is obtained by forming a metal plate, which is made of stainless steel, for example, into a predetermined shape by press working. As described above, the stopper plate 7 is fixed to the valve plate 3 (specifically, to the frame part 5) together with the reed 4 by means of the coupling member 8.

Figure 5A:
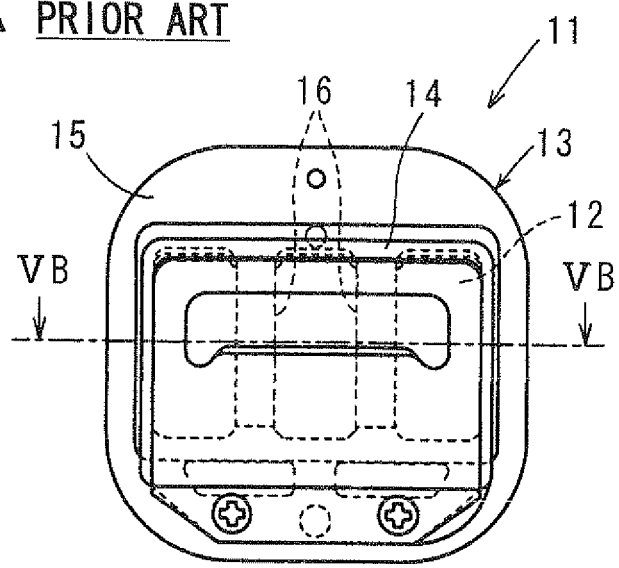
FIG. 5A is a plan view illustrating a previously proposed reed valve.
Figure 5B:
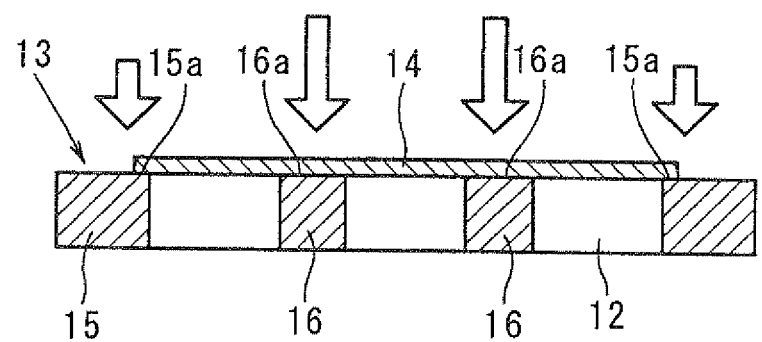
FIG. 5B is a sectional view roughly illustrating a valve plate and a reed taken along a line VB-VB in FIG. 5A.

Effects of the first embodiment will be described. In the reed valve 1 of the first embodiment, as above, "the column seating surface 6a of the supporting column 6" is formed one level lower than "the frame seating surface 5a of the frame part 5". Accordingly, as illustrated in FIG. 2, the reed 4 is bent as a result of the application of the pressure (exhaust pressure) in the valve closing direction (downward) to the reed 4. In this manner, by the amount of bending of the reed 4, the load, which is applied to the supporting column 16 in the conventional art, can be spread to the frame part 5, whose strength is increased due to the support of the frame part 5 by the fixing member 20 (see the size of the "white arrow" in FIG. 2 in comparison to FIG. 5B). As a result, the load applied to the support column 6 can be reduced, and a defect of the fracture of the support column 6 can be avoided even in the case of application of a large pressure in the valve closing direction (high exhaust pressure).

The reed valve 1 is used as the check valve in the secondary air supply system 60 as described above. The fracture of the reed valve 1 is avoided despite the application of high exhaust gas pressure, so that reliability of the secondary air supply system 60 can be improved.

(Second Embodiment)

Figure 3A:
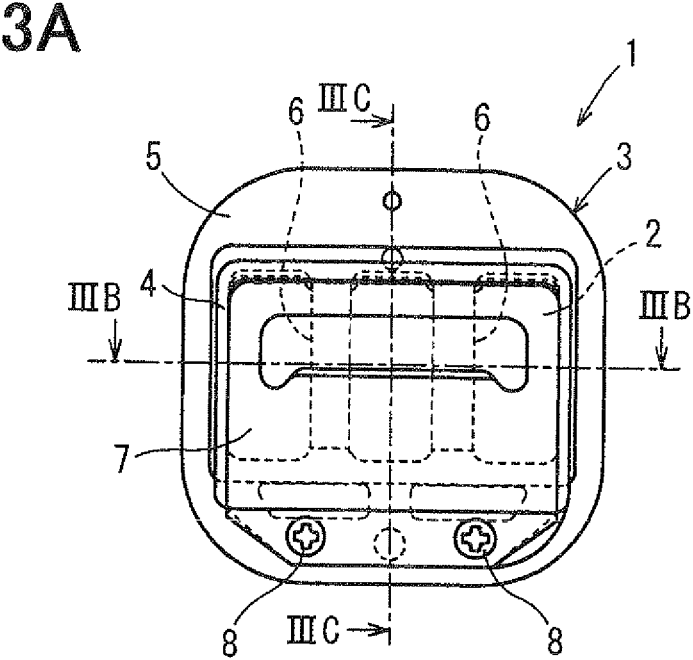
FIG. 3A is a plan view illustrating a reed valve in accordance with a second embodiment of the invention.
Figure 3B:
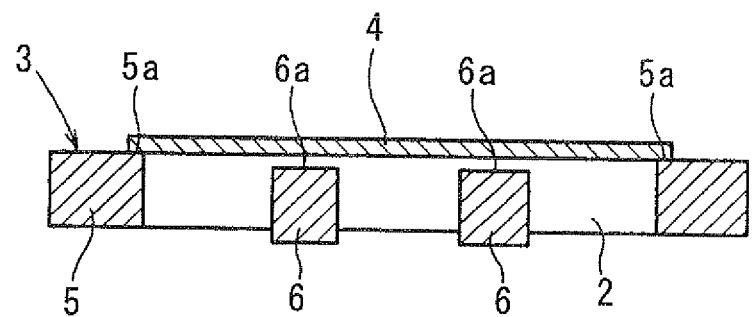
FIG. 3B is a sectional view roughly illustrating a valve plate and a reed taken along a line IIIB-IIIB in FIG. 3A.
Figure 3C:
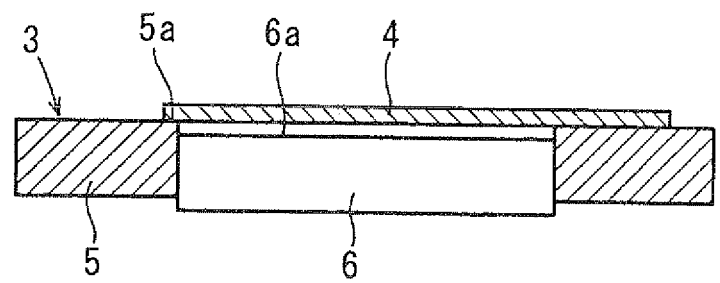
FIG. 3C is a sectional view roughly illustrating the valve plate and the reed taken along a line IIIC-IIIC in FIG. 3A.

A second embodiment of the invention will be described in reference to FIGS. 3A to 3C. In the following embodiment, the same numeral as in the above first embodiment indicates its corresponding functional component. In the above first embodiment, the example, in which the lower surface of the supporting column 6 is made to coincide with the lower surface of the frame part 5, has been described. In other words, the supporting column 6 of the first embodiment has a smaller thickness in its thickness direction (up-down direction) than the supporting column 16 of the conventional art.

On the other hand, in the second embodiment, a thickness of a supporting column 6 in its thickness direction is set to be the same as a thickness of a frame part 5 in its thickness direction. Accordingly, the supporting column 6 of the second embodiment is formed such that the thickness of the supporting column 6 in its thickness direction is the same as the conventional art.

Consequently, deterioration in strength of the supporting column 6 as a result of the reduction of thickness of the supporting column 6 can be prevented. In addition, as a result of employment of this second embodiment, a lower part of the supporting column 6 projects downward from a lower end of a valve plate 3. However, because this downwardly projecting portion of the column 6 is located inside the secondary air passage 70, the reed valve 1 is not influenced when disposed in the secondary air passage 70 of the secondary air supply system 60 for the engine 50.

(Third Embodiment)

Figure 4A:
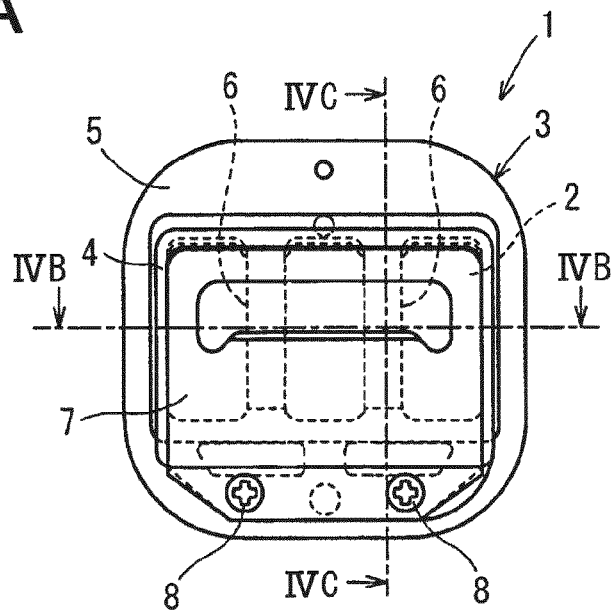
FIG. 4A is a plan view illustrating a reed valve in accordance with a third embodiment of the invention.
Figure 4B:
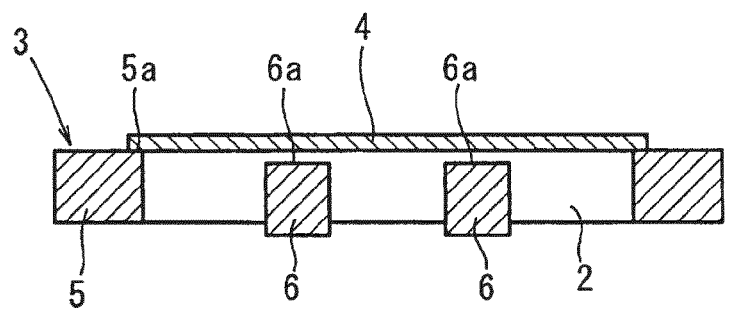
FIG. 4B is a sectional view roughly illustrating a valve plate and a reed taken along a line IVB-IVB in FIG. 4A.
Figure 4C:
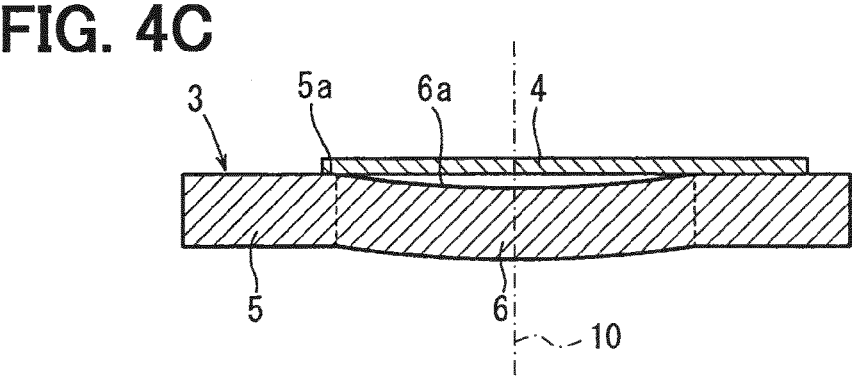
FIG. 4C is a sectional view roughly illustrating the valve plate and the reed taken along a line IVC-IVC in FIG. 4A.

A third embodiment of the invention will be described with reference to FIGS. 4A to 4C. In the first and second embodiments, the example, in which the column seating surface 6a is formed on a flat surface that is parallel to the frame seating surface 5a (flat surface), has been described. In this third embodiment, as illustrated in FIG. 4B, a column seating surface 6a is bent in a circular arc shape such that a region of the column seating surface 6a on the center side 10 of an opening 2 is recessed downward of the opening 2.

By forming the column seating surface 6a into the shape of a circular arc as described above, when a reed 4 is sagged so that the reed 4 is brought into contact with a supporting column 6, a contact range between the reed 4 and the supporting column 6 can be broadened. Accordingly, a load transmitted to the supporting column 6 from the reed 4 can be distributed to a wide range of the supporting column 6. Since a stress generated in the supporting column 6 is distributed, the supporting column 6 is not easily fractured.

Industrial applicability of the reed valve 1 will be described.

In the above embodiments, the example of application of the invention to the reed valve 1 in the secondary air supply system 60 is described. However, the invention is not limited to the reed valve 1 in the secondary air supply system 60, and the invention is applicable to a reed valve 1 for other uses that flows fluid only in one direction. In the above embodiments, the example, in which the reed 4 is formed from metal (e.g., stainless steel), has been described. Alternatively, depending on its intended use, the reed 4 may be formed from other materials such as resin including carbon fiber or glass fiber. In the above embodiments, the example, in which the valve plate 3 is made of metal (e.g., aluminum), is described. Alternatively, depending on its intended use, the valve plate 3 may be formed from other materials such as resin.

The reed valve 1 of the above embodiments can be summarized as follows.

The reed valve 1 is adapted to be fixed to fixing member 20. The reed valve 1 includes a valve plate 3 and a resiliently deformable reed 4. The valve plate 3 is fixed to the fixing member 20 and includes a frame part 5 and a supporting column 6. The frame part 5 has an opening 2 inward of the frame part 5. The opening 2 passes through the frame part 5 in a thickness direction of the valve plate 3. The supporting column 6 is disposed across an inside of the opening 2. The reed 4 is configured to open or close the opening 2. The frame part 5 includes a frame seating surface 5a reed 4 is engaged. The supporting column 6 includes a column seating surface 6a with which the reed 4 is engaged. The column seating surface 6a ("upper surface" of the supporting column 6 in the case of the reed 4 being disposed on the upper surface of the valve plate 3, as one example) is recessed relative to the frame seating surface 5a ("upper surface" of the frame part 5 in the case of the reed 4 being disposed on the upper surface of the valve plate 3, as one example) in the thickness direction ("lowered" in the case of the reed 4 being disposed on the upper surface of the valve plate 3, as one example: see FIGS. 1A to 4C).

By configuring the reed valve 1 in this manner, the reed 4 is warped due to the reception of pressure by the reed 4 in the valve closing direction when the reed 4 closes the opening 2. By the amount of bending of the reed 4 as above, the load, which is applied to the supporting column 16 in the conventional art, can be scattered over the frame part 5. Thus, because the load applied to the supporting column 6 can be decreased, the defect of the fracture of the support column 6 due to the pressure in the valve closing direction can be avoided.

A thickness of the supporting column 6 in the thickness direction may be the same as a thickness of the frame part 5 in the thickness direction (see FIGS. 3A to 4C). In other words, in the case of the reed 4 being disposed on the upper surface of the valve plate 3, for example, the supporting column 6 is formed such that the thickness of the supporting column 6 in its thickness direction is the same as in the conventional art. By forming the column 6 in this manner, a defect of reduction in thickness of the supporting column 6 can be avoided. Therefore, a defect of decrease of strength of the supporting column 6 due to the reduction of thickness of the supporting column 6 can be avoided.

By using this means, a part of the supporting column 6 (opposite side of the column 6 from the column seating surface 6a) protrudes from the valve plate 3. Nevertheless, since this protruding portion of the column 6 is on the central side of the reed valve 1 (inside the passage through which fluid flows), an influence of this protrusion when the reed valve 1 is disposed in the secondary air passage 70 can be limited.

The column seating surface 6a may be formed, such that a region of the column seating surface 6a on a center side of the opening 2 is bent in a shape of a circular arc to be sagged relative to the frame seating surface 5a in the thickness direction (sagged toward "the lower side" in the case of the reed 4 being disposed on the upper surface of the valve plate 3, as one example). See FIGS. 4A to 4C. By forming the column seating surface 6a in a circular arc manner as described above, when the reed 4 is sagged so that the reed 4 is brought into contact with the supporting column 6, a contact range between the reed 4 and the supporting column 6 can be broadened. Thus, the load transmitted from the reed 4 to the supporting column 6 can be distributed to a wide range of the supporting column 6, so that the supporting column 6 cannot be easily fractured.

The reed valve 1 may be adapted for a secondary air supply system 60 including a secondary air passage 70, through which air is pressure-fed into an exhaust passage 30 of an engine 50. A catalyst 40 may be disposed in the exhaust passage 30. The secondary air supply system 60 supplies air to an upstream side of the catalyst 40 in the exhaust passage 30 in an exhaust gas flow direction. The reed valve 1 may be disposed in the secondary air passage 70 to serve as a check valve for preventing a backflow of exhaust gas toward an upstream side of the secondary air passage 70 in an air flow direction. As a result of the application of the invention to the reed valve 1 of the secondary air supply system 60, despite the application of high exhaust gas pressure (e.g., pressure of exhaust gas at the time of high rotation of the engine) to the reed valve 1, a defect of damage to the reed valve 1 (fracture of the supporting column 6) can be avoided, so that reliability of the secondary air supply system 60 can be improved.

Additional advantages and modifications will readily occur to those skilled in the art. The invention in its broader terms is therefore not limited to the specific details, representative apparatus, and illustrative examples shown and described.

What is claimed is:

1. A reed valve adapted to be fixed to a fixing member, the reed valve comprising:
    a valve plate that is fixed to the fixing member and includes:
    a frame part having an opening inward of the frame part, the opening passing through the frame part in a thickness direction of the valve plate; and
    a supporting column disposed across an inside of the opening; and
    a resiliently deformable reed that is configured to open or close the opening, wherein:
    the frame part includes a frame seating surface with which the reed is engaged;
    the supporting column includes a column seating surface with which the reed is engaged; and
    the column seating surface is recessed relative to the frame seating surface in the thickness direction,
    wherein a thickness of the supporting column in the thickness direction is the same as a thickness of the frame part in the thickness direction.

2. The reed valve according to claim 1, wherein the column seating surface is formed, such that a region of the column seating surface on a center side of the opening is bent in a shape of a circular arc to be sagged relative to the frame seating surface in the thickness direction.

3. The reed valve according to claim 1, wherein:
    the reed valve is adapted for a secondary air supply system including a secondary air passage, through which air is pressure-fed into an exhaust passage of an engine, a catalyst disposed in the exhaust passage;
    the secondary air supply system supplies air to an upstream side of the catalyst in the exhaust passage in an exhaust gas flow direction; and
    the reed valve is disposed in the secondary air passage to serve as a check valve for preventing a backflow of exhaust gas toward an upstream side of the secondary air passage in an air flow direction.

* * * * *